(12) United States Patent
Hofmann et al.

(10) Patent No.: US 6,833,431 B2
(45) Date of Patent: Dec. 21, 2004

(54) DOUBLE-METAL CYANIDE CATALYSTS FOR PREPARING POLYETHER POLYOLS

(75) Inventors: Jörg Hofmann, Krefeld (DE); Pieter Ooms, Krefeld (DE); Walter Schäfer, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 433 days.

(21) Appl. No.: 10/133,287

(22) Filed: Apr. 26, 2002

(65) Prior Publication Data

US 2003/0204045 A1 Oct. 30, 2003

(30) Foreign Application Priority Data

May 2, 2001 (DE) .......................................... 101 21 312

(51) Int. Cl.$^7$ ............................................. C08G 65/10
(52) U.S. Cl. ...................... 528/403; 502/175; 528/408; 528/414; 528/415
(58) Field of Search .......................... 502/175; 528/408, 528/414, 415

(56) References Cited

U.S. PATENT DOCUMENTS

| | | | |
|---|---|---|---|
| 3,404,109 A | 10/1968 | Milgrom et al. ............. | 260/611 |
| 3,829,505 A | 8/1974 | Herold et al. ................ | 260/611 |
| 3,941,849 A | 3/1976 | Herold ........................ | 260/607 |
| 5,158,922 A | 10/1992 | Hinney et al. ............... | 502/175 |
| 5,470,813 A | 11/1995 | Le-Khac ...................... | 502/175 |
| 5,482,908 A * | 1/1996 | Le-Khac ...................... | 502/156 |
| 5,545,601 A | 8/1996 | Le-Khac ...................... | 502/156 |
| 5,627,120 A | 5/1997 | Le-Khac ...................... | 502/156 |
| 6,018,017 A | 1/2000 | Le-Khac ...................... | 528/421 |

FOREIGN PATENT DOCUMENTS

| | | | |
|---|---|---|---|
| CA | 2 362 503 | 8/2001 | |
| EP | 0 700 949 | 3/1999 | |
| JP | 4-145123 | 5/1992 | |
| WO | WO 200047647 A1 * | 8/2000 | ........... C08G/18/00 |
| WO | 01/34297 | 5/2001 | |

OTHER PUBLICATIONS

Kunststoffhandbuch, vol. 7, Polyurethane, 3$^{rd}$ edition, (month unavailable) 1993, pp. 25–32, Herstellungsmethoden für Polyurethane, Prof. Dr. D. Dietrich, Dr. H.G. Schmelzer.

Kunststoffhandbuch, vol. 7, Polyurethane, 3$^{rd}$ edition (month unavailable) 1993, pp. 57–67, Polyole Dr. K. Schauerte and Dr. P. Gupta.

* cited by examiner

Primary Examiner—Margaret G. Moore
Assistant Examiner—Marc S Zimmer
(74) Attorney, Agent, or Firm—Joseph C. Gil; John E. Mrozinski, Jr.

(57) ABSTRACT

The invention is directed to a double-metal cyanide catalyst for the preparation of a polyether polyol by the polyaddition of an alkylene oxide on to a starter compound containing active hydrogen atoms, wherein the DMC catalyst comprises a) at least one double-metal cyanide compound; b) at least one organic complexing ligand which is not a polyether, a bile acid, a bile acid salt, a bile acid ester or a bile acid amide; c) at least one polyether; and d) at least one bile acid, bile acid salt, bile acid ester or bile acid amide. The catalyst of the present invention has increased activity in the preparation of a polyether polyol.

11 Claims, No Drawings

DOUBLE-METAL CYANIDE CATALYSTS FOR PREPARING POLYETHER POLYOLS

TECHNICAL FIELD OF THE INVENTION

The invention is directed to a double-metal cyanide ("DMC") catalyst for preparing a polyether polyol by the polyaddition of an alkylene oxide on to a starter compound containing active hydrogen atoms.

BACKGROUND OF THE INVENTION

DMC catalysts for the polyaddition of alkylene oxides on to starter compounds containing active hydrogen atoms are known. See, for example, U.S. Pat. Nos. 3,404,109, 3,829, 505, 3,941,849 and 5,158,922. The use of these DMC catalysts for the preparation of polyether polyols reduces the content of mono-functional polyethers with terminal double bonds, the so-called "mono-ols", in comparison to the preparation of polyether polyols with alkali catalysts, such as alkali metal hydroxides.

Polyether polyols produced by DMC catalysis can be used to process high-quality polyurethanes (e.g. elastomers, foams and coatings). DMC catalysts are usually obtained by reacting an aqueous solution of a metal salt with an aqueous solution of a metal cyanide salt in the presence of an organic complexing ligand, e.g., an ether. In a typical DMC catalyst preparation, aqueous solutions of zinc chloride (in excess) and potassium hexacyanocobaltate are mixed to form a dispersion. Dimethoxyethane (glyme) is then added to the dispersion. After filtering and washing the dispersion with the aqueous glyme solution, an active catalyst of the general formula $$Zn_3[Co(CN)_6]_2 \cdot xZnCl_2 \cdot yH_2O \cdot zglyme$$

is obtained. See, for example, EP 700 949.

The following references disclose DMC catalysts which use tert-butanol as the organic complexing ligand (by itself or in combination with a polyether) in the preparation of polyether polyols to further reduce the content of mono-functional polyethers with terminal double bonds: JP 4145123; U.S. Pat. No. 5,470,813; EP 700 949; EP 743 093; EP 761 708; and WO 97/40086. Additionally, the use of these DMC catalysts reduces the induction time in the polyaddition reaction of alkylene oxides with corresponding starter compounds. Catalyst activity also increases. By shortening alkoxylation times, the process of preparing polyether polyols becomes more cost effective. Additionally, due to their increased activity, DMC catalysts can be used in low concentrations (25 ppm or less), making the expensive process of removing catalysts from polyether polyols no longer necessary.

SUMMARY OF THE INVENTION

The object of the present invention is to provide a DMC catalyst for producing a polyether polyol by the polyaddition of an alkylene oxide on to a starter compound. The DMC catalyst of the present invention has increased catalyst activity compared to known DMC catalysts. The object of the present invention is accomplished by providing a DMC catalyst comprising: a) at least one DMC compound; b) at least one organic complexing ligand which is not a polyether, a bile acid, a bile acid salt, a bile acid ester or a bile acid amide; c) at least one polyether; and d) at least one bile acid, bile acid salt, bile acid ester or bile acid amide.

Hereinafter, the polyether c) and the bile acid, bile acid salt, bile acid ester or bile acid amide d), may be jointly referred to as "the complexing components".

DETAILED DESCRIPTION OF THE INVENTION

The DMC catalyst of the present invention can optionally comprise water, preferably in an amount from 1 to 10 wt. %. Also, the DMC catalyst of the present invention can optionally comprise one or more water-soluble metal salts, preferably in an amount from 5 to 25 wt. %.

The DMC compound a) is the reaction product of a water-soluble metal salt and a water-soluble metal cyanide salt. A water-soluble metal salt suitable for the preparation of the DMC compound a) is represented by the formula (I)

$$M(X)_n \tag{I}$$

wherein

M is selected from Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III), (preferably, Zn(II), Fe(II), Co(II) and Ni(II));

each X is identical or different, preferably identical, and an anion, selected from halides, hydroxides, sulfates, carbonates, cyanates, thiocyanates, isocyanates, isothiocyanates, carboxylates, oxalates and nitrates; and n is 1, 2 or 3.

Examples of suitable water-soluble metal salts useful in the present invention are zinc chloride, zinc bromide, zinc acetate, zinc acetylacetonate, zinc benzoate, zinc nitrate, iron(II) sulfate, iron(II) bromide, iron(II) chloride, cobalt(II) chloride cobalt(II) thiocyanate, nickel(II) chloride, nickel(II) nitrate and mixtures thereof.

A water-soluble metal cyanide salt suitable for the preparation of the DMC compound a) is represented by the formula (II)

$$(Y)_a M'(CN)_b (A)_c \tag{II}$$

wherein

M' is selected from Fe(II), Fe(III), Co(II), Co(III), Cr(II), Cr(III), Mn(II), Mn(III), Ir(III), Ni(II), Rh(III), Ru(II), V(IV) and V(V), (Co(II), Co(III), Fe(II), Fe(III), Cr(III), Ir(III) and Ni(II) are preferred) and the water-soluble metal cyanide salt can comprise one or more of these metals;

each Y is identical or different, preferably identical, and is chosen from the group consisting of alkali metal ions and alkaline earth metal ions;

A is identical or different, preferably identical, and is chosen from halides, hydroxides, sulfates, carbonates, cyanates, thiocyanates, isocyanates, isothiocyanates, carboxylates, oxalates and nitrates; and a, and b and c are integers, with the values for a, b and c being chosen so that electroneutrality of the metal cyanide salt is achieved (a is preferably 1, 2, 3 or 4; b is preferably 4, 5 or 6; and c preferably has the value 0).

Examples of water-soluble metal cyanide salts useful in the present invention are potassium hexacyanocobaltate(III), potassium hexacyanoferrate(II), potassium hexacyanoferrate(III), calcium hexacyanocobaltate(III) and lithium hexacyanocobaltate(III).

A preferred DMC compound a) according to the invention is a compound represented by the formula (III)

$$M_x[M'_{x'}(CN)_y]_z \tag{III}$$

wherein

M is as defined in formula (I);

M' is as defined in formula (II); and x, x', y and z are integers and are chosen such that electroneutrality of the DMC compound exists.
Preferably, x=3, x'=1, y=6 and z=2';

M=Zn(II), Fe(II), Co(II) or Ni(II); and

M'=Co(II), Fe(III), Cr(III) or Ir(III).

Examples of suitable DMC compounds a) useful in the present invention are zinc hexacyanocobaltate(III), zinc hexacyanoiridate(III), zinc hexacyanoferrate(III) and cobalt (II) hexacyanocobaltate(III). Further examples of suitable DMC compounds a) are found in U.S. Pat. No. 5,158,922. Zinc hexacyanocobaltate(III) is the preferred DMC compound useful in the present invention.

Organic complexing ligands b) useful in the present invention are known and described in the following references: U.S. Pat. Nos. 5,158,922, 3,404,109, 3,829,505, 3,941,849, EP 700 949, EP 761 708, JP 4145123, U.S. Pat. No. 5,470,813, EP 743 093 and WO 97/40086. Organic complexing ligands useful in the present invention are water-soluble organic compounds with heteroatoms, such as oxygen, nitrogen, phosphorus or sulfur, which can form complexes with the DMC compound a).

Suitable organic complexing ligands useful in the present invention are alcohols, aldehydes, ketones, ethers, esters, amides, ureas, nitriles, sulfides and mixtures thereof. Preferred organic complexing ligands are water-soluble aliphatic alcohols, such as ethanol, isopropanol, n-butanol, iso-butanol, sec-butanol or tert-butanol. Tert-butanol is particularly preferred.

The organic complexing ligand b) is added either during the preparation of the DMC catalyst or directly after the precipitation of the DMC compound a). The organic complexing ligand b) is usually used in excess.

The DMC compound a) is present in amount from about 20 to about 90 wt. %, preferably 25 to 80 wt. %, based on the total weight of the DMC catalyst. The organic complexing ligand b) is present in an amount from about 0.5 to about 30 wt. %, preferably 1 to 25 wt. %, based on the total weight of the DMC catalyst. The DMC catalyst according to the invention preferably comprises from about 1 to about 80 wt. %, preferably 1 to 40 wt. %, based on the total weight of the DMC catalyst, of a mixture of a polyether c) and a bile acid, bile acid salt, bile acid ester or bile acid amide d).

Polyethers c) suitable for use in the present invention are known and are described in the following references: EP 700 949, EP 761 708 and WO 97/40086. Preferably, polyether polyols with hydroxy functionalities of 1 to 8, preferably 1 to 3, and having a number average molecular weight of between 150 and $10^7$, preferably between 200 and $5 \cdot 10^4$, are used in the present invention. The polyether polyols may be obtained by ring-opening polymerization of an epoxide in the presence of starter compounds containing active hydrogen atoms under basic, acid or co-ordinative catalysis (e.g., DMC catalysis).

Examples of suitable polyether polyols useful in the present invention are poly(oxypropylene)polyols, poly(oxyethylene)polyols, EO-capped poly(oxypropylene) polyols, EO/PO-polyols, butylene oxide polymers, butylene oxide copolymers with ethylene oxide and/or propylene oxide and poly(oxytetramethylene) glycols.

Suitable bile acids d) useful in the present invention are $C_{24}$-steroid-carboxylic acids, which are breakdown products of cholesterol and may be derived from 5β-cholan-24-oic acids by introduction of hydroxyl groups in the α-position on C-3, C-6, C-7 and C-12. A preferred bile acid is represented by the general formula

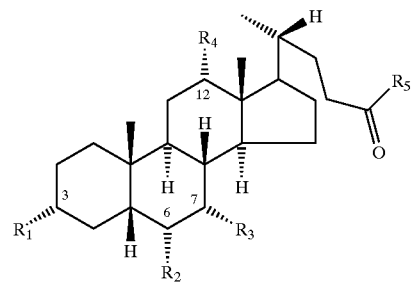

wherein $R_1$, $R_2$, $R_3$ and $R_4$ independently of one another denote H or OH; and $R_5$ denotes OH, NH—$CH_2$—COOH, NH—$CH_2$—$CH_2$—$SO_3H$, NH—$(CH_2)_3$—$N^+(CH_3)_2$—$CH_2$—CHOH—$CH_2$—$SO_3^-$ or NH—$(CH_2)_3$—$N^+(CH_3)_2$—$(CH_2)_3$—$SO_3^-$.

The free acid, a salt of the bile acid, preferably an alkali metal or an alkaline earth metal salt, or an ester of the bile acid, preferably with an alkyl radical having 1 to 30 C atoms, or an amide of the bile acid, preferably with an alkyl radical, a sulfoalkyl radical, a sulfoalkylaminoalkyl radical, a sulfohydroxyalkylaminoalkyl radical or a carboxyalkyl radical in the acid or salt form, is suitable for use in the present invention.

Examples of suitable bile acids or salts, esters or amides thereof useful in the present invention are cholic acid (3α,7α,12α-trihydroxy-5β-cholan-24-oic acid; $R_1=R_3=R_4=R_5=OH$, $R_2=H$), cholic acid sodium salt (sodium cholate), lithium cholate, potassium cholate, glycol-cholic acid (3α,7α,12α-trihydroxy-5β-cholan-24-oic acid N-[carboxymethyl]amide; $R_1=R_3=R_4=OH$, $R_2=H$, $R_5=NH$—$CH_2$—COOH), sodium glycocholate, taurocholic acid (3α,7α,12α-trihydroxy-5β-cholan-24-oic acid N-[2-sulfoethyl]amide; $R_1=R_3=R_4=OH$, $R_2=H$, $R_5=NH$—$CH_2$—$CH_2$—$SO_3H$), sodium taurocholate, deoxycholic acid (3α,12α-dihydroxy-5β-cholan-24-oic acid; $R_1=R_4=R_5=OH$, $R_2=R_3=H$), sodium deoxycholate, potassium deoxycholate, lithium deoxycholate, glycodeoxycholic acid (3α,12α-dihydroxy-5β-cholan-24-oic acid N-[carboxymethyl]amide; $R_1=R_4=OH$, $R_2=R_3=H$, $R_5=NH$—$CH_2$—COOH), sodium glycodeoxycholate, taurodeoxycholic acid (3α,12α-dihydroxy-5β-cholan-24-oic acid N-[2-sulfoethyl]amide; $R_1=R_4=OH$, $R_2=R_3=H$, $R_5=NH$—$CH_2$—$CH_2$—$SO_3H$), sodium taurodeoxycholate, chenodeoxycholic acid (3α,7α-dihydroxy-5β-cholan-24-oic acid; $R_1=R_3=R_5=OH$, $R_2=R_4=H$), sodium chenodeoxycholate, glycochenodeoxycholic acid (3α,7α-dihydroxy-5β-cholan-24-oic acid N-[carboxymethyl]amide; $R_1=R_3=OH$, $R_2=R_4=H$, $R_5=NH$—$CH_2$—COOH), sodium glycochenodeoxycholate, taurochenodeoxycholic acid (3α,7β-dihydroxy-5β-cholan-24-oic acid N-[2-sulfoethyl]amide; $R_1=R_3=OH$, $R_2=R_4=H$, $R_5=NH$—$CH_2$—$CH_2$—$SO_3H$), sodium taurochenodeoxycholate, lithocholic acid (3α-hydroxy-5β-cholan-24-oic acid; $R_1=R_5=OH$, $R_2=R_3=R_4=H$), sodium lithocholate, potassium lithocholate, hyocholic acid (3α,6α,7α-trihydroxy-5β-cholan-24-oic acid; $R_1=R_2=R_3=R_5=OH$, $R_4=H$), sodium hyocholate, lithium hyocholate, potassium hyocholate, hyodeoxycholic acid (3α,6α-dihydroxy-5β-cholan-24-oic acid; $R_1=R_2=R_5=OH$; $R_3=R_4=H$), sodium hyodeoxycholate, lithium hyodeoxycholate, potassium hyodeoxycholate, cholic acid methyl ester, cholic acid ethyl ester, deoxycholic acid ethyl ester and hyocholic acid methyl ester.

Preferably, a sodium, lithium or potassium salt or a methyl or ethyl ester of a cholic acid, a glycocholic acid, a taurocholic acid, a deoxycholic acid, a glycodeoxycholic acid, a taurodeoxycholic acid, a chenodeoxycholic acid, a glycochenodeoxycholic acid, a taurochenodeoxycholic acid, a lithocholic acid, a hyocholic acid, a hyodeoxycholic acid or a mixture thereof is used in the present invention.

Bile acids useful in the present invention are ursocholic acid ($3\alpha,7\alpha,12\alpha$-trihydroxy-$5\alpha$-cholan-24-oic acid), ursodeoxycholic acid ($3\alpha,7\alpha$-dihydroxy-$5\beta$-cholan-24-oic acid), 7-oxo-lithocholic acid ($3\alpha$-hydroxy-7-oxo-$5\beta$-cholan-24-oic acid), lithocholic acid 3-sulfate ($3\alpha$-hydroxy-$5\beta$-cholan-24-oic acid 3-sulfate), nor-cholic acid and bis-nor-cholic acid, or salts, esters or amides thereof.

Bile acids, salts, esters or amides thereof are known and are described in detail in *Nachr. Chem. Tech. Lab.* 43 (1995) 1047, as well as in *Setchell* et al., *The Bile Acids, Vol.* 4, Plenum, N.Y. 1998 and in *Römpp, Lexikon Naturstoffe*, Stuttgart, N.Y. 1997, p. 248 et seq.

The DMC catalyst according to the present invention can be crystalline, partly crystalline or amorphous. The crystallinity is typically analyzed by powder X-ray diffraction.

The DMC catalyst composition is typically analyzed with elemental analysis, thermogravimetry or extractive removal of the complexing components with subsequent gravimetric determination.

A preferred DMC catalyst according to the present invention comprises a) zinc hexacyanocobaltate(III); b) tert-butanol; c) at least one polyether; and d) at least one bile acid, bile acid salt, bile acid ester or bile acid amide.

The DMC catalyst of the present is typically prepared in aqueous solution by reacting a metal salt, preferably one represented by the formula (I), with a metal cyanide salt, preferably one represented by the formula (II), in the presence of an organic complexing ligand b), which is neither a polyether nor a bile acid, bile acid salt, bile acid ester or bile acid amide. In this preparation, in an aqueous solution, the metal salt (for example, zinc chloride, employed in a stoichiometric excess (at least 50 mol. %, based on the molar amount of metal cyanide salt)) is reacted with the metal cyanide salt (for example, potassium hexacyanocobaltate) in the presence of the organic complexing ligand b) (for example tert-butanol). A suspension comprising the DMC compound a) (for example, zinc hexacyanocobaltate), water, excess metal salt, and the organic complexing ligand b) is formed.

The organic complexing ligand b) is either present in the aqueous solution of the metal salt and/or the metal cyanide salt, or is added directly to the suspension after precipitation of the DMC compound a). Preferably, the mixture of aqueous solution and organic complexing ligand b) is vigorously stirred. The suspension formed is then treated with a mixture of the complexing components c) and d). The mixture of complexing components c) and d) is preferably used in a mixture of water and organic complexing ligand b).

The DMC catalyst is then isolated from the suspension by known techniques, such as centrifugation or filtration. In a preferred embodiment of the present invention, the isolated DMC catalyst is washed with an aqueous solution of the organic complexing ligand b) (for example, by re-suspension and then renewed isolation by filtration or centrifugation). Water-soluble by-products, for example, potassium chloride, are removed from the DMC catalyst by washing the DMC catalyst with an aqueous solution of the organic complexing ligand b).

The amount of organic complexing ligand b) in the aqueous wash solution is preferably between 40 and 80 wt. %, based on the total weight of aqueous wash solution. Preferably, a small amount of the complexing components c) and d), preferably 0.5 to 5 wt. %, based on the total weight of aqueous wash solution, is added to the aqueous wash solution.

Preferably, the DMC catalyst is washed more than once. This can be accomplished by repeating the aqueous wash solution procedure described above. However, the use of a non-aqueous wash solution for further washing operations is preferred. The non-aqueous wash solution comprises a mixture of organic complexing ligand b) and the complexing components c) and d).

The washed DMC catalyst is then dried, optionally after pulverization, at a temperature between 20–100° C. and under a pressure of between 0.1 mbar to 1,013 mbar.

The present invention is also directed to the use of the DMC catalyst according to the invention in a process for the preparation of a polyether polyol by the polyaddition of an alkylene oxide on to a starter compound containing active hydrogen atoms.

Alkylene oxides preferably used in the present invention are ethylene oxides, propylene oxides, butylene oxides and mixtures thereof. The build-up of the polyether chains by alkoxylation can be accomplished by using only one monomeric epoxide, or randomly or blockwise with 2 or 3 different monomeric epoxides. Further details in this regard can be found in *Ullmanns Encyclopädie der industriellen Chemie*, Volume A21, 1992, p. 670 et seq.

Starter compounds containing active hydrogen atoms which are preferably used in the present invention are compounds with a number average molecular weight of 18 to 2,000 with 1 to 8 hydroxyl groups. Examples of such starter compounds are ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, sucrose, a degraded starch or water.

A starter compound containing active hydrogen atoms which has been prepared by conventional alkali catalysis from a low molecular weight starter compound mentioned above and is an oligomeric alkoxylation product with a number average molecular weight of 200 to 2,000 is preferably used in the present invention.

The polyaddition, catalyzed by the DMC catalyst of the present invention, of an alkylene oxide on to a starter compound containing active hydrogen atoms is carried out at a temperature between 20 to 200° C., preferably between 40 to 180° C., more preferably, between 50 to 150° C. The reaction can be carried out under an overall pressure of 0.0001 to 20 bar. The polyaddition can be carried out in bulk or an inert organic solvent, such as toluene and/or tetrahydrofuran ("THF"). The amount of solvent is usually 10 to 30 wt. %, based on the total weight of polyether polyol to be prepared.

The DMC catalyst concentration is chosen such that sufficient control of the polyaddition reaction is possible under the given reaction conditions. The catalyst concentration is typically in the range from 0.0005 wt. % to 1 wt. %, preferably, 0.001 wt. % to 0.1 wt. %, more preferably, 0.001 to 0.0025 wt. %, based on the total weight of polyether polyol to be prepared.

The number average molecular weight of the polyether polyol prepared by the process of the present invention is in the range from 500 to 1100,000 g/mol, preferably, 1,000 to 50,000 g/mol, more preferably, 2,000 to 20,000 g/mol.

The polyaddition can be carried out continuously or discontinuously, (e.g. in a batch or in semi-batch process).

Because of their significantly increased activity, the DMC catalysts of the present invention can be used in low concentrations (25 ppm and less, based on the amount of polyether polyol to be prepared). In the preparation of polyurethanes, if a polyether polyol is prepared in the presence of the DMC catalyst according to the present invention, the step of removing the DMC catalyst from the polyether polyol can be omitted without adversely affecting the product quality of the resulting polyurethane (*Kunststoffhandbuch*, Vol. 7, *Polyurethane*, 3rd Ed. 1993, p. 25–32 and 57–67).

EXAMPLES

Catalyst Preparation

Example A
Preparation of a DMC Catalyst with a Polyether and a Bile Acid Salt (Catalyst A):

A solution of 12.5 g (91.5 mmol) zinc chloride in 20 ml distilled water was added to a solution of 4 g (12 mmol) potassium hexacyanocobaltate in 70 ml distilled water and vigorously stirred (24,000 rpm) until a suspension was formed. Immediately thereafter, a mixture of 50 g tert-butanol and 50 g distilled water was added to the suspension and the mixture was stirred vigorously (24,000 rpm) for 10 min. A mixture of 0.5 g polypropylene glycol with a number average molecular weight of 2,000 ("polypropylene glycol 2000") and 0.5 g cholic acid sodium salt, 1 g tert-butanol and 100 g distilled water was then added and the mixture is stirred (1,000 rpm) for 3 min. The resulting solid was isolated by filtration, subsequently stirred (10,000 rpm) for 10 min with a mixture of 70 g tert-butanol, 30 g distilled water, 0.5 g polypropylene glycol 2000 and 0.5 g cholic acid sodium salt and filtered again. Finally, the solid was stirred (10,000 rpm) again for 10 min with a mixture of 100 g tert-butanol, 0.25 g polypropylene glycol 2000 and 0.25 g cholic acid sodium salt. After filtration, the catalyst was dried to a constant weight at 50° C. under normal pressure.

Yield of dried, pulverulent catalyst: 4.8 g Elemental analysis, thermogravimetric analysis and extraction: cobalt=11.9 wt. %, zinc=25.3 wt. %, tert-butanol=7.8 wt. %, polypropylene glycol 2000=22.7 wt. %, cholic acid sodium salt=3.2 wt. %.

Example B (Comparison)
Preparation of a DMC Catalyst with a Polyether without a Bile Acid Salt (Catalyst B):

A solution of 12.5 g (91.5 mmol) zinc chloride in 20 ml distilled water was added to a solution of 4 g (12 mmol) potassium hexacyanocobaltate in 70 ml distilled water and vigorously stirred (24,000 rpm) until a suspension was formed. Immediately thereafter, a mixture of 50 g tert-butanol and 50 g distilled water was added to the suspension and the mixture was then stirred vigorously (24,000 rpm) for 10 min. A mixture of 1 g polypropylene glycol 2000, 1 g tert-butanol and 100 g distilled water was then added and the mixture was stirred (1,000 rpm) for 3 min. The resulting solid was isolated by filtration, subsequently stirred (10,000 rpm) for 10 min with a mixture of 70 g tert-butanol, 30 g distilled water and 1 g polypropylene glycol 2000 and filtered again. Finally, the solid was stirred (10,000 rpm) again for 10 min with a mixture of 100 g tert-butanol and 0.5 g polypropylene glycol 2000. After filtration, the catalyst was dried to constant weight at 50° C. under normal pressure.

Yield of dried, pulverulent catalyst: 6.2 g Elemental analysis, thermogravimetric analysis and extraction: cobalt=11.6 wt. %, zinc=24.6 wt. %, tert-butanol=3.0 wt. %, polypropylene glycol 2000=25.8 wt. %.

Example C (Comparison)
Preparation of a DMC Catalyst with a Bile Acid Salt without a Polyether (Catalyst C):

The procedure was as set forth in Example B, however, a cholic acid sodium salt was employed in lieu of a polyether.

Yield of dried, pulverulent catalyst: 4.2 g Elemental analysis, thermogravimetric analysis and extraction: cobalt=12.6 wt. %, zinc=27.3 wt. %, tert-butanol=10.9 wt. %, cholic acid sodium salt=4.3 wt. %.

Preparation of a Polyether Polyol:
General Procedure 50 g polypropylene glycol starter (number average molecular weight of 1,000 g/mol) and 5 mg catalyst (25 ppm, based on the amount of polyether polyol to be prepared) were introduced into a 500 ml pressure reactor under an inert gas (argon) and were heated up to 105° C., while stirring. Propylene oxide (approx. 5 g) was then metered in all at once, until the overall pressure had risen to 2.5 bar. Further propylene oxide was only metered in again when an accelerated drop in pressure in the reactor was observed. This accelerated drop in pressure indicated that the catalyst was activated. The remaining propylene oxide (145 g) was then metered in continuously under a constant overall pressure of 2.5 bar. When metering of the propylene oxide was complete and after an after-reaction time of 2 hours at 105° C., volatile contents were distilled off at 90° C. (1 mbar) and the mixture was then cooled to room temperature.

The resulting polyether polyol was characterized by determining the OH number, the double-bond content and the viscosity.

The course of the reaction was monitored with the aid of time/conversion curves (propylene oxide consumption [g] v. reaction time [min]). The induction time was determined from the point of intersection of the tangent at the steepest point of the time/conversion curve with the extended base line of the curve. The propoxylation times, which were decisive for the catalyst activity, correspond to the period of time between activation of the catalyst (end of the induction period) and the end of metering the propylene oxide. The total reaction time was the sum of the induction and propoxylation time.

Example 1
Preparation of a Polyether Polyol with Catalyst A (25 ppm):

| | |
|---|---|
| Induction time: | 135 min |
| Propoxylation time: | 19 min |
| Total reaction time: | 154 min |
| Polyether polyol: | OH number (mg KOH/g): 29.8 |
| Double bond content (mmol/kg): | 7 |
| Viscosity 25° C. (mPas): | 843 |

Example 2 (Comparison)
Preparation of a Polyether Polyol with Catalyst B (25 ppm):

| | |
|---|---|
| Induction time: | 100 min |
| Propoxylation time: | 110 min |
| Total reaction time: | 210 min |
| Polyether polyol: | OH number (mg KOH/g): 28.1 |

-continued

| | |
|---|---|
| Double bond content (mmol/kg): | 7 |
| Viscosity 25° C. (mPas): | 849 |

Example 3 (Comparison)
Preparation of a Polyether Polyol with Catalyst C (25 ppm):

| | |
|---|---|
| Induction time: | 217 min |
| Propoxylation time: | 33 min |
| Total reaction time: | 250 min |
| Polyether polyol: | OH number (mg KOH/g): 29.6 |
| Double bond content (mmol/kg): | 6 |
| Viscosity 25° C. (mPas): | 855 |

Catalyst A, which had both polypropylene glycol 2000 and cholic acid sodium salt as the complexing components, had a substantially higher activity than Catalyst B and Catalyst C, which had only polypropylene glycol 2000 or cholic acid sodium salt as the complexing component.

What is claimed is:

1. A double-metal cyanide catalyst comprising:
   a) at least one double-metal cyanide compound;
   b) at least one organic complex ligand which is not a polyether, a bile acid, a bile acid salt, a bile acid ester or a bile acid amide;
   c) at least one polyether;
   d) at least one bile acid, bile acid salt, bile acid ester or bile acid amide.

2. The double-metal cyanide catalyst according to claim 1, further comprising water and/or a water-soluble metal salt.

3. The double-metal cyanide catalyst according to claim 1, wherein the double-metal cyanide compound is zinc hexacyanocobaltate (III).

4. The double-metal cyanide catalyst according to claim 1, wherein the organic complex ligand is an alcohol, aldehyde, ketone, ether, ester, amide, urea, nitrile, sulfide and/or a mixture thereof.

5. The double-metal cyanide catalyst according to claim 1, wherein the organic complex ligand is tert-butanol.

6. The double-metal cyanide catalyst according to claim 1, wherein the double-metal cyanide catalyst contains up to about 80 wt. %, based on the total weight of the double-metal cyanide catalyst, of a mixture of the polyether c) and the bile acid, bile acid salt, bile acid ester or bile acid amide d).

7. The double-metal cyanide catalyst according to claim 1, wherein component d) is a sodium, lithium or potassium salt or a methyl or ethyl ester of a cholic acid, a glycocholic acid, a taurocholic acid, a deoxycholic acid, a glycodeoxycholic acid, a taurodeoxycholic acid, a chenodeoxycholic acid, a glycochenodeoxycholic acid, a taurochenodeoxycholic acid, a lithocholic acid, a hyocholic acid, a hyodeoxycholic acid or a mixture thereof.

8. A process for the preparation of a double-metal cyanide catalyst according to claim 1, comprising the steps of: (a) reacting, in aqueous solution, (i) at least one metal salt, (ii) with at least one metal cyanide salt, in the presence of (iii) an organic complex ligand, which is not a polyether, a bile acid, a bile acid salt, a bile acid ester, or a bile acid amide, to form a suspension; and (b) treating the suspension with at least one polyether and at least one bile acid, bile acid salt, bile acid ester or bile acid amide.

9. A process according to claim 8, further comprising the steps of: (c) isolating the catalyst from suspension after (b); (d) washing the isolated catalyst; and (e) drying the isolated catalyst.

10. A process for the production of a polyether polyol by the polyaddition of an alkylene oxide onto a starter compound containing active hydrogen atoms in which the polyaddition of the alkylene oxide is conducted in the presence of the double-metal cyanide catalyst of claim 1.

11. A polyether polyol prepared by the process of claim 10.

* * * * *